March 10, 1931. C. SCHMIDT 1,795,379
METHOD OF MAKING FLANGED CUP SHAPED METAL PARTS
Filed June 27, 1927 2 Sheets-Sheet 1
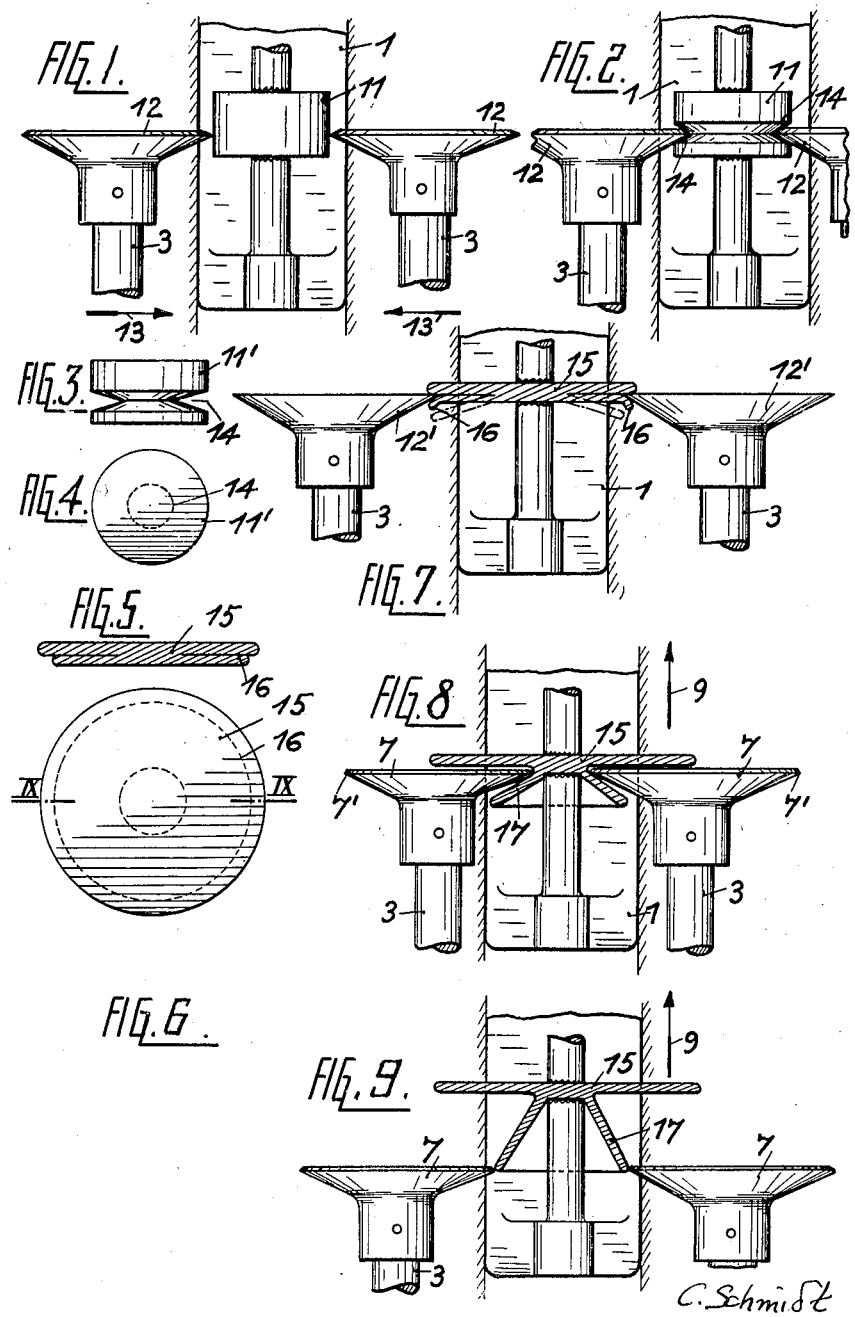

March 10, 1931. C. SCHMIDT 1,795,379
METHOD OF MAKING FLANGED CUP SHAPED METAL PARTS
Filed June 27, 1927 2 Sheets-Sheet 2
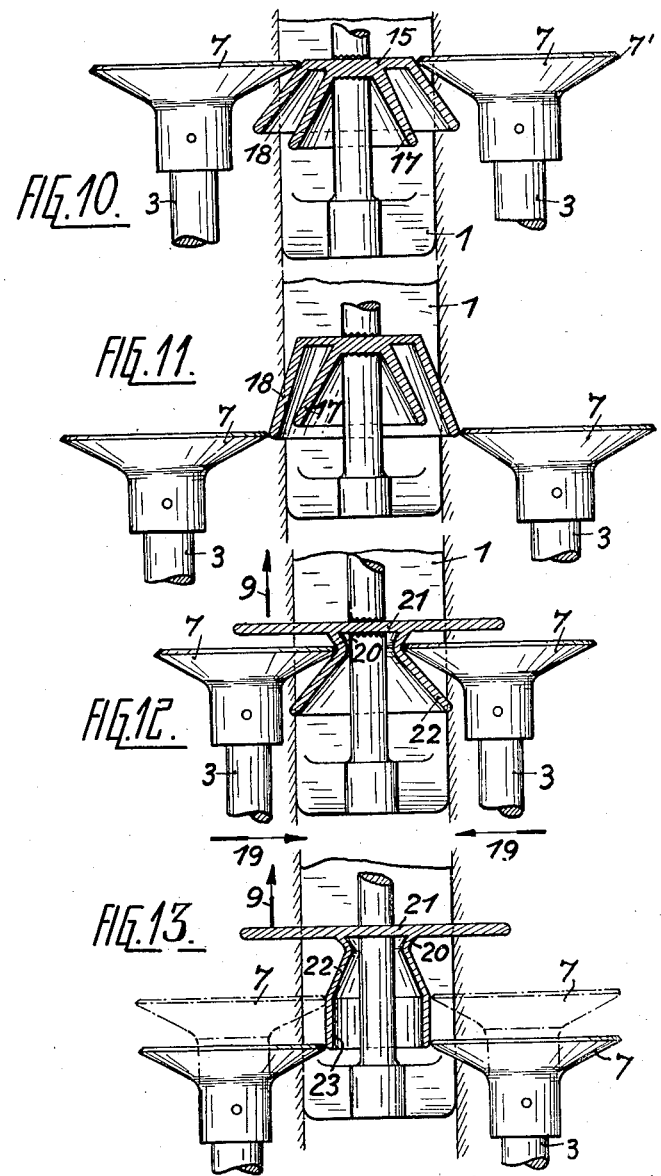

Patented Mar. 10, 1931

1,795,379

UNITED STATES PATENT OFFICE

CARL SCHMIDT, OF BAERL, GERMANY

METHOD OF MAKING FLANGED CUP-SHAPED METAL PARTS

Application filed June 27, 1927, Serial No. 201,850, and in Germany July 5, 1926.

My invention relates to a method of making flanged cup-shaped metal parts.

It is an object of my invention to so perform the method that the parts are obtained without any auxiliaries, such as mandrels, supporting rollers, etc.

To this end I form in the blank a circumferential lip, open out one part of the lip by a sharp-edged rotary tool, and forge down the metal of the opened-out part by applying not less than two rotary tools to opposite sides of the blank and by imparting relative axial motion to the tools and the blank.

In the drawings accompanying this specification a mill in which my novel method may be performed, is illustrated diagrammatically by way of example.

The generation of the following parts is illustrated:

1. Figs. 1 to 9: simple flanged cups,
2. Figs. 10 and 11: flanged and double-walled cups,
3. Figs. 12 and 13: flanged cups which are partly tapered and partly cylindrical.

More particularly,—

Figs. 1 and 2 illustrate two stages of splitting the edge of a blank for flanged cups, Figs. 3 and 4 are an elevation and a plan view of the blank as rolled, Figs. 5 and 6 are corresponding illustrations of the blank after forging down, Figs. 7, 8 and 9, illustrate various stages of rolling the blank.

Referring now to Figs. 1 and 2, 1 is a slide adapted to be displaced in suitable guides by any means, not shown, 11 is a circular block which is rotatably carried on the slide 1 by means of an arbour, 3, 3 are shafts adapted to be rotated in the direction of the arrows 13, 13, and 12, 12 are sharp-edged rollers which are placed on the shafts 3, 3. The slide 1 is held stationary and the shafts 3, besides being rotated, are moved inwardly. The rollers 12 will then mill a groove 14 in the block 11, and finally the block will assume the condition indicated by "11'" in Figs. 3 and 4. This block 11' is then forged, pressed or rolled into a flat plate or disc 15 with a peripheral lip 16, as shown in Figs. 5 and 6.

This disc is then secured in the slide 1 and the lip 16 is opened out by rollers 12' which are similar to the rollers 12 and bend down the lip 16 into the position shown in dotted lines in Fig. 7. For finishing the disc 15, rollers 7, 7' having rounded edges are provided, and the initial and finishing stages are shown in Figs. 8 and 9. The cup has a flange and a tapered rim 17.

When it is desired to have a double-walled cup the flange of the cup which projects beyond its bottom is rolled down by means of round-edged rollers 7, as shown in Figs. 10 and 11. The taper of the rim is a function of the rate of velocities and so it is possible to generate a cup the two walls of which vary as to taper, as shown in Fig. 11 where the outer wall 18 is tapered at a steeper angle than the inner one 17.

Figs. 12 and 13 illustrate the generation of a cup which is partly tapered and partly cylindrical. The blank is a flanged cup as shown in Fig. 9. At the beginning of the operation, the rollers 7 are at the same level as the lower face of the flange 21. By raising the slide 1 and at the same time moving the shafts 3 inwardly as shown in Fig. 12, the rim 22 is contracted. By moving them outwards again into the position of Fig. 13 an outward taper 22 is formed upon continued upward motion of the slide 1. When after forging the taper 22 the shafts 3, 3 are held stationary a cylinder 23 will be formed on the taper when the slide moves further.

It will be understood that various shapes and combinations of shapes may be generated by varying the relative motions and velocity rates of the parts.

I claim:

1. The method of making flanged cup-shaped metal parts consisting in making a blank with a circumferential lip, opening out one part of said lip by a sharp-edged rotary tool, and forging down the metal of the opened-out part by applying not less than two rotary tools to opposite sides of the blank, and by imparting relative axial motion to said tools and said blank.

2. The method of making double-walled cup-shaped metal parts consisting in making a blank with a circumferential lip, opening out one part of said lip by a sharp-edged rotary tool, forging down the metal of the opened-out part by applying not less than two rotary tools to opposite sides of the blank, imparting relative axial motion to said tools and said blank, and forging down the other part of said lip so as to surround said opened-out part.

3. The method of making flanged cup-shaped metal parts consisting in grooving a block by gradually moving sharp-edged rotary tools into said block from two sides, forging down said block so as to compress said groove into a lip, opening out one part of said lip by a sharp-edged rotary tool, and forging down the metal of the opened-out part by applying not less than two rotary tools to opposite sides of the blank, and by imparting relative axial motion to said tools and said blank.

In testimony whereof I affix my signature.

CARL SCHMIDT.